A. H. DE VOE.
MECHANICAL MOVEMENT.
APPLICATION FILED FEB. 4, 1915.

1,201,026.

Patented Oct. 10, 1916.
9 SHEETS—SHEET 1.

WITNESSES:
L. E. Fischer.
Géza L. Turna

INVENTOR
Albert H. De Voe
BY
ATTORNEY

A. H. DE VOE.
MECHANICAL MOVEMENT.
APPLICATION FILED FEB. 4, 1915.

1,201,026.

Patented Oct. 10, 1916.
9 SHEETS—SHEET 2.

WITNESSES:
L. E. Fischer
Géra L. Torna

INVENTOR
Albert H. De Voe
BY F. W. Ostrom
ATTORNEY

A. H. DE VOE.
MECHANICAL MOVEMENT.
APPLICATION FILED FEB. 4, 1915.

1,201,026.

Patented Oct. 10, 1916.
9 SHEETS—SHEET 4.

WITNESSES:
L. E. Fischer.
Géza L. Terra

INVENTOR
Albert H. De Voe.
BY
ATTORNEY

A. H. DE VOE.
MECHANICAL MOVEMENT.
APPLICATION FILED FEB. 4, 1915.

1,201,026.

Patented Oct. 10, 1916.
9 SHEETS—SHEET 5.

WITNESSES:
L. E. Fischer.
Géza L. Ferna

INVENTOR
Albert H. De Voe.
BY Ostrom
ATTORNEY

A. H. DE VOE.
MECHANICAL MOVEMENT.
APPLICATION FILED FEB. 4, 1915.

1,201,026.

Patented Oct. 10, 1916.
9 SHEETS—SHEET 6.

WITNESSES:
L. E. Fischer.
Géza L. Ferna

INVENTOR
Albert H. De Voe
BY
ATTORNEY

A. H. DE VOE.
MECHANICAL MOVEMENT.
APPLICATION FILED FEB. 4, 1915.

1,201,026.

Patented Oct. 10, 1916.
9 SHEETS—SHEET 7.

WITNESSES:
L. E. Fischer.
Géza L. Tuma

INVENTOR
Albert H. De Voe.
BY
ATTORNEY

A. H. DE VOE.
MECHANICAL MOVEMENT.
APPLICATION FILED FEB. 4, 1915.

1,201,026.

Patented Oct. 10, 1916.
9 SHEETS—SHEET 8.

WITNESSES:
L. E. Fischer.
Géza L. Ferra

INVENTOR
Albert H. De Voe.
BY
ATTORNEY

UNITED STATES PATENT OFFICE.

ALBERT H. DE VOE, OF WESTFIELD, NEW JERSEY, ASSIGNOR TO THE SINGER MANUFACTURING COMPANY, A CORPORATION OF NEW JERSEY.

MECHANICAL MOVEMENT.

1,201,026.  Specification of Letters Patent.  Patented Oct. 10, 1916.

Application filed February 4, 1915. Serial No. 5,994.

*To all whom it may concern:*

Be it known that I, ALBERT H. DE VOE, a citizen of the United States, residing at Westfield, in the county of Union and State of New Jersey, have invented certain new and useful Improvements in Mechanical Movements, of which the following is a specification, reference being had therein to the accompanying drawings.

This invention relates to that class of mechanical movements adapted to transmit motion from one to a separate shaft, such transmission being effected by arranging between the shaft-cranks a connection positively controlled to effect movements of the separate shafts in given directions, the connection being supported and controlled solely by said shafts, and to this end each shaft is provided with a crank whose axis is arranged oblique to the axis of its shaft, the torsional action of the connection at the dead-center positions of the cranks insuring that the driven shaft will be rotated in a single direction only.

While the object attained by the present invention is not new to the art, the same being effected by the employment of gears of like ratio, it is believed that to operatively connect two shaft-cranks by a connection which overcomes the dead-center positions of said cranks and which is supported and controlled solely by said shafts is generic to the art of power transmission.

In the accompanying drawings which form a part of the specification, Fig. 5 detail views in perspective of the crank-member, the crank connection and the crank connection fulcrum-pin. Fig. 6 a view showing the pitman, partly in full lines and partly in section, together with a sectional view of the line *a—b* Fig. 2. Figs. 9 to 16 both inclusive represent a second modification in which Figs. 17 to 21, both inclusive, represent a third modified form of construction in which Figs. 22 to 26, both inclusive represent a fourth modified form of construction, in which

Figure 1:
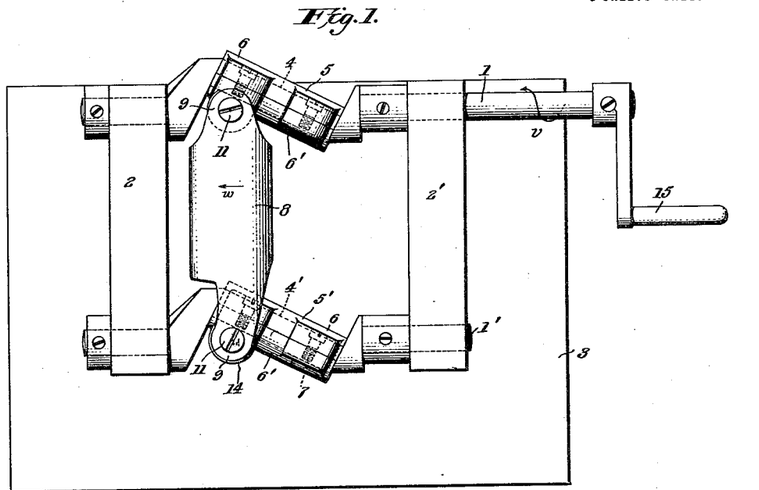
Figures 1 and 2 are views in elevation of the present invention showing the crank-members in their oppositely arranged dead-center positions and the pitman or driving connection in its median position of oscillatory movement and Figs. 3 and 4 like views showing the crank-members in their median positions with respect to their dead-center positions and the pitman in its position of reverse oscillation.
Figure 2:
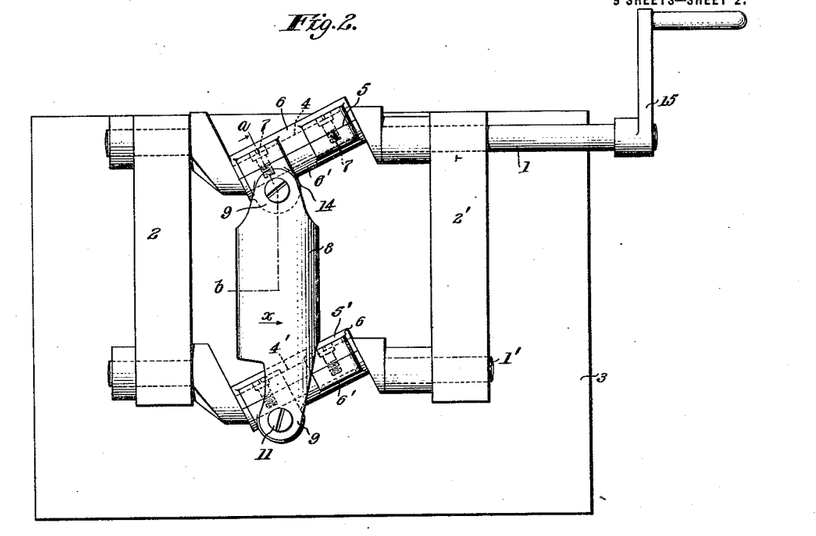
Figure 3:
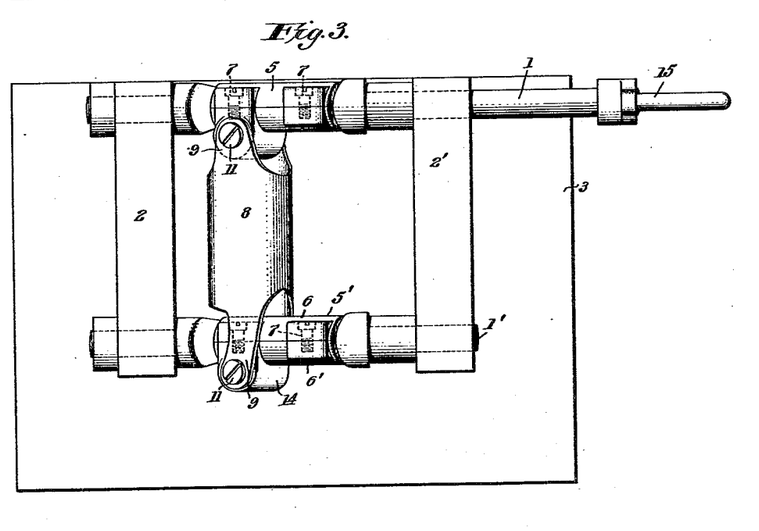
Figures 4, 5, 6:
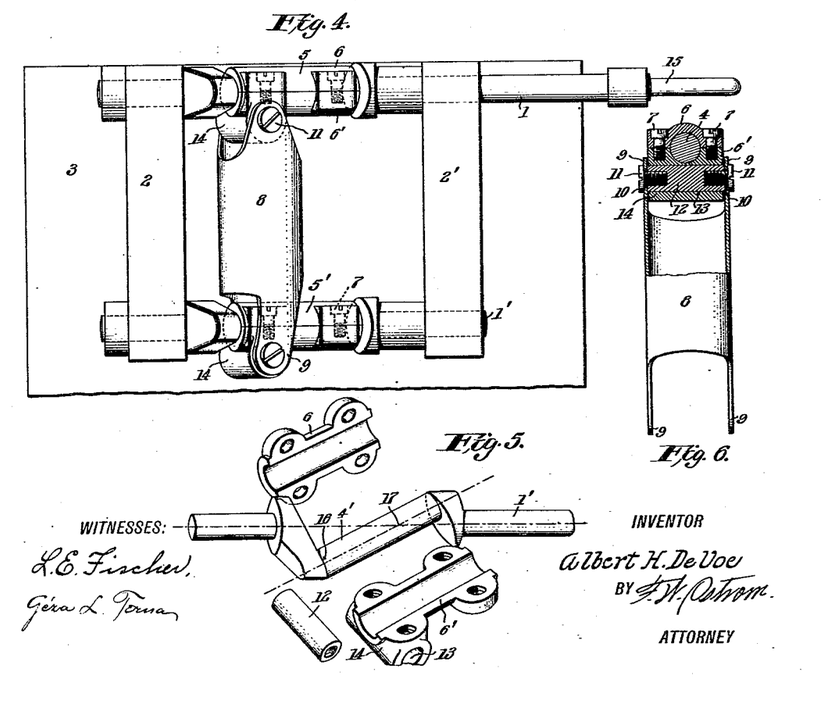

Referring more particularly to Figs. 1 to 6 both inclusive, 1 and 1' represent vertically arranged parallel shafts journaled in suitable bearings formed in the brackets 2 and 2' suitably secured to the plate 3, the shafts 1 and 1' being provided with crank-members 4 and 4', respectively, the axis of each of said crank-members being arranged oblique to the axis of its shaft and upon each of the crank-members 4 and 4' is journaled a crank connection 5 and 5', respectively, said crank connections preferably comprising two members 6 and 6' secured together by suitable screws as 7. 8 represents a pitman or driving connection provided at its opposite ends with bearing lugs, as 9, having openings, as 10, for the reception of the screws, as 11, threaded into the fulcrum-pins, as 12, free to turn in the bearings, as 13, formed in the lugs, as 4, of the member 6' of the crank connecti⋯ ⋯s, it being understood that the crank-mem⋯ r⋯ are similar in construction and function, as are the crank connections. 15 denotes a driving crank suitably secured upon the shaft 1. In the present development of the invention the axis of each crank-member is arranged to cross the axis of its operating shaft wth the object of balancing, to a substantial degree, the movements of the crank-members about the axis of its shaft and to effect a greater length of bearing for the crank connection, it being understood that the crank-members and crank connections might be limited to a length corresponding to the distance between the shoulder 16 and the vertex 17 of the two axes, as shown in Fig. 5, further, that the axes of the pivotal connections represented by the screws 11 might be located to intersect the axes of the crank-members, the present construction being preferable as it effects means convenient to the employment of the fulcrum-pins as 12. Taking Fig. 1 as representing the position of rest of the present mechanical movement, wherein the cranks occupy their dead-center positions and the pitman its median position of oscillatory movement, the sequence of movements of the respective elements, by quarter turns, in effecting one complete rotation are as follows: As the shaft 1 is given a quarter turn in the direction indicated by the arrow $v$, Fig. 1, to the position shown in Fig. 3 the cranks are moved to their median positions intermediate their dead-center positions and the pitman from its median position of oscillatory movement to its position of reverse oscillation in the direction indicated by the arrow $w$ Fig. 2, the second quarter turn position of the elements being represented by Fig. 2 wherein the cranks occupy their second dead-center positions and the pitman its second median position of oscillation in the direction indicated by the arrow $x$ Fig. 2, the third quarter position being represented by Fig. 4 when the cranks are in their second median position intermediate their dead-center positions and the pitman in its second position of reverse oscillation, from which latter position the parts are returned to their starting positions in the direction indicated by the arrow $w$ Fig. 2, or to the positions represented by Fig. 1. From the foregoing it is to be understood that the pitman is controlled by the driving crank to transmit power in transverse directions *i. e.* a direct drive in the direction of the length of the pitman and a torsional drive transverse to such direct action, thus effecting a torsional drive of the driven crank when in its dead-center position, as represented by Figs. 1 and 2; that there is both a direct and torsional drive except when the cranks occupy their dead-center positions or the link connection is in its position of reverse oscillation; that such direct and torsional drive gives to the driven shaft movements isochronal with the driving shaft and that the pitman has oppositely directed lateral movements from one to the other of the dead-center positions of said cranks.

Figure 7:
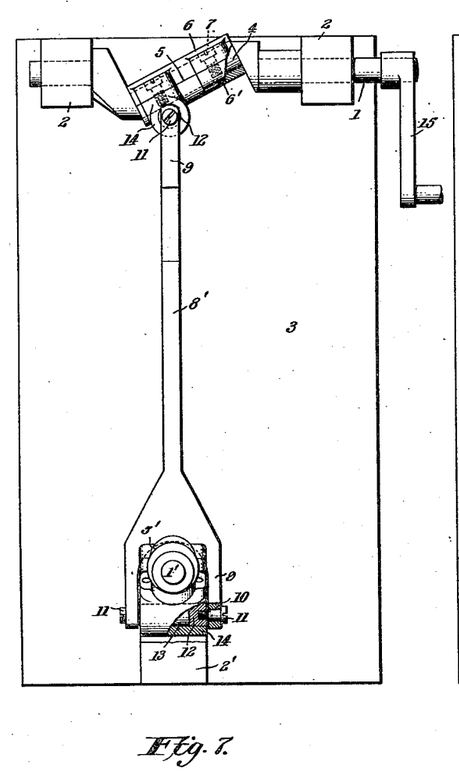
Figs. 7 and 8, transversely arranged views, in elevation, of a modified form of construction wherein the driven shaft is arranged at right angles to the driving shaft, the opposite ends of the pitman being arranged in like manner with respect to the crank connections carried by the respective shaft cranks.
Figure 8:
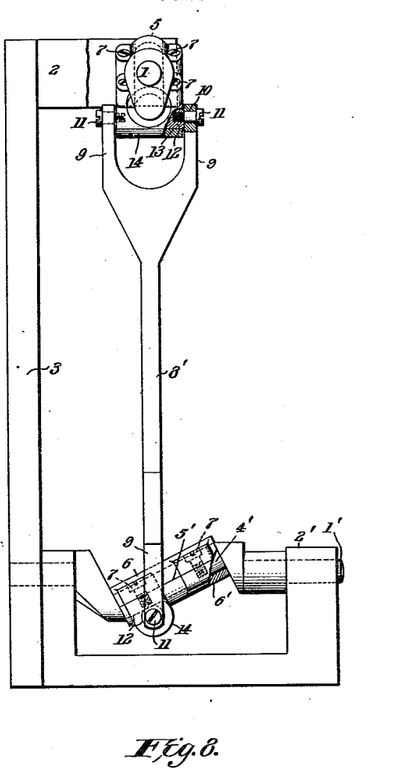
Figure 9:
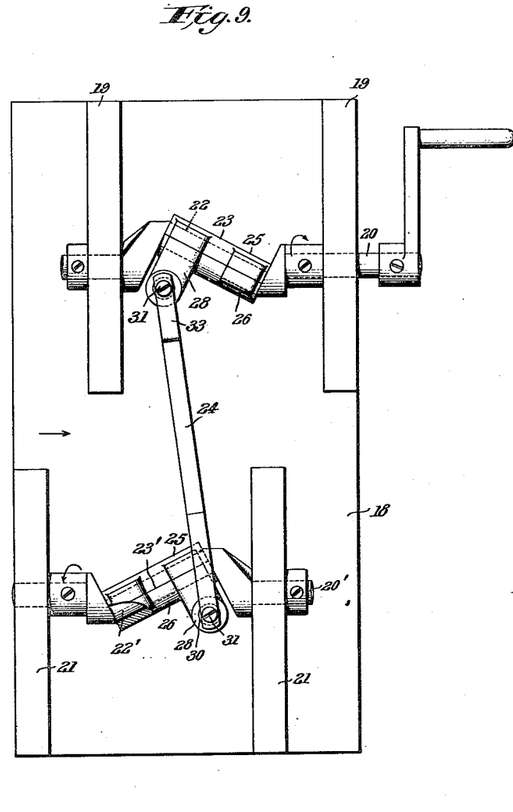
Figs. 9 and 10 are side elevations showing the crank-members in their oppositely arranged dead-center positions.
Figure 10:
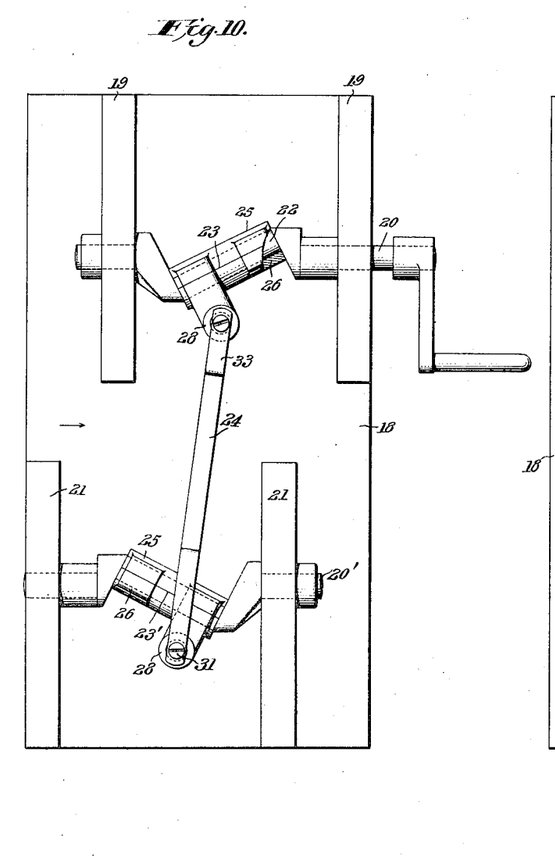
Figure 11:
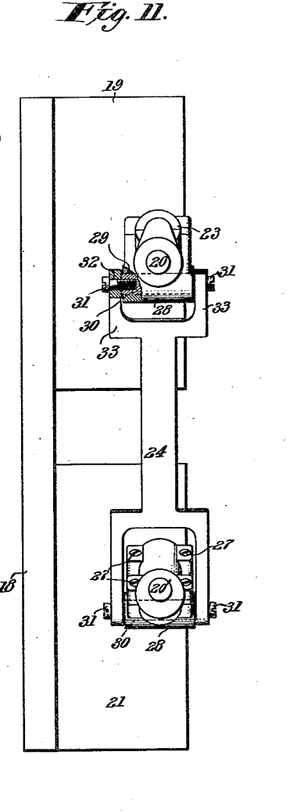
Figs. 11 and 12 end elevations of Figs. 9 and 10 respectively looking in the direction indicated by the arrow on the latter figures, the front bearings being omitted.
Figure 12:
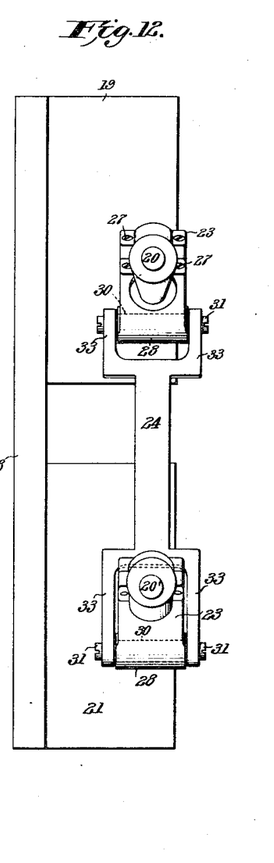
Figure 13:
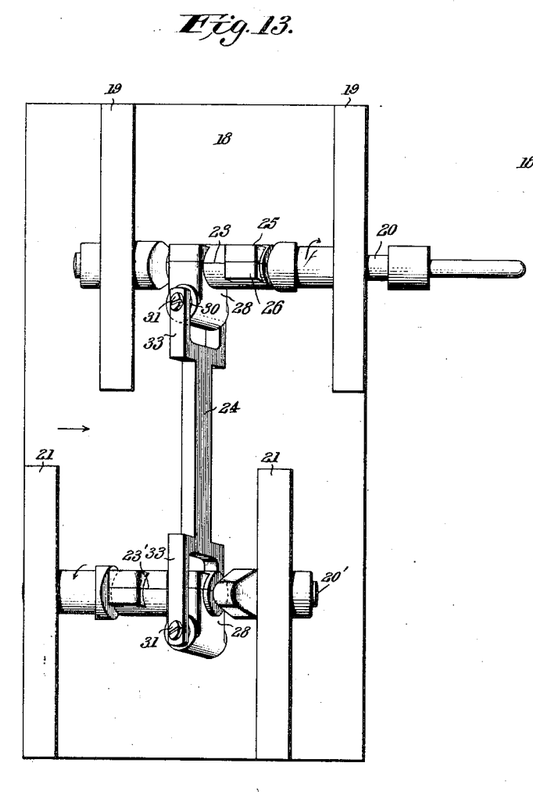
Figs. 13 and 14 side elevations showing the pitman in its oppositely arranged dead-center positions.
Figure 14:
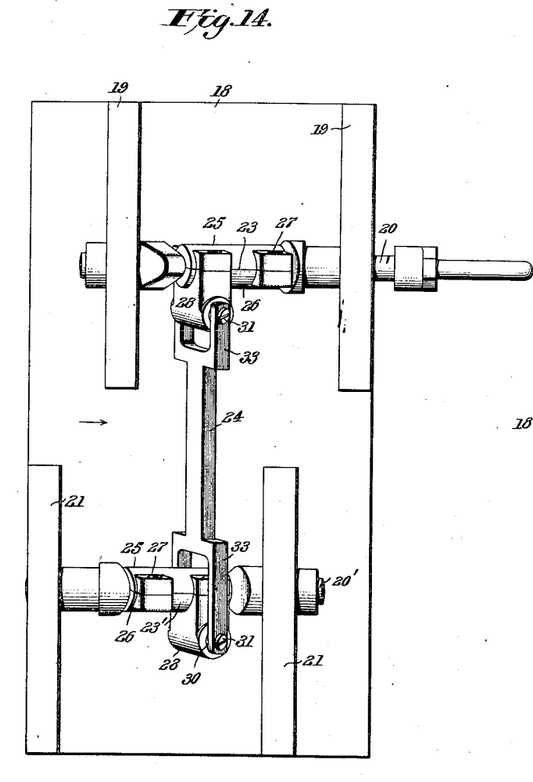
Figure 15:
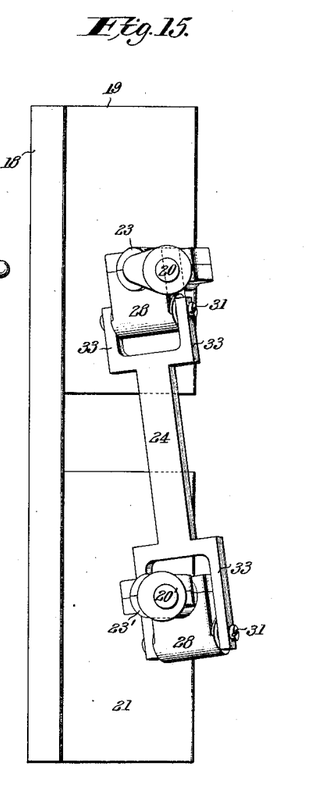
Figs. 15 and 16 end elevations of Figs. 13 and 14 respectively, looking in the direction indicated by the arrow on the latter figures.
Figure 16:
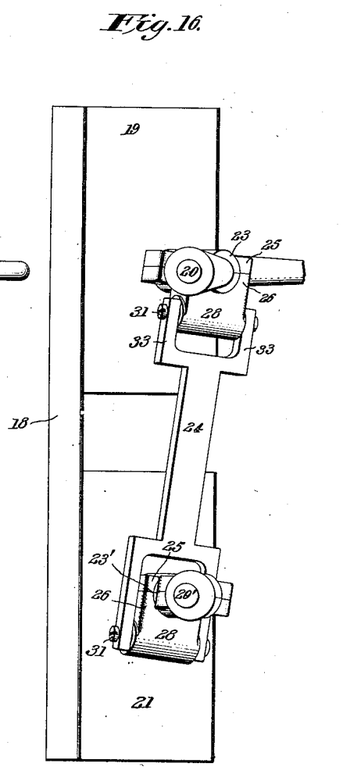
Figures 17, 18:
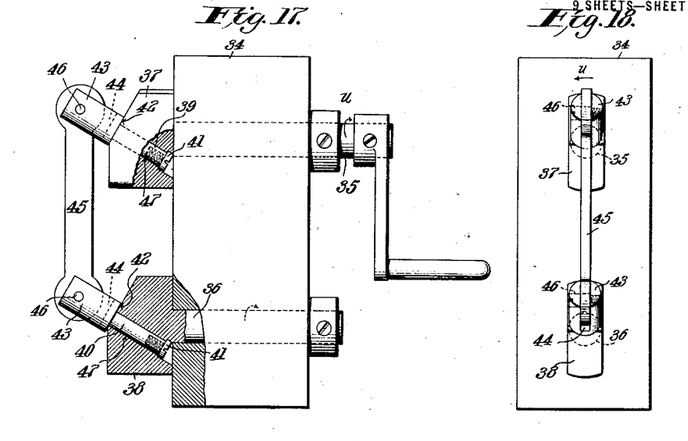
Fig. 17 is a side elevation.
Figs. 18 and 19 end elevations of Fig. 17 showing the crank-members in their oppositely arranged dead-center positions and Figs. 20 and 21 end elevations of Fig. 17 showing the pitman in its oppositely arranged dead-center positions.

In the modification represented by Figs. 7 and 8, the driving and driven shafts 1 and 1', the brackets 2 and 2', plate 3, cranks 4 and 4', crank connections 5 and 5', comprising members 6 and 6', respectively, the securing screws as 7, bearing lugs as 9, screw openings as 10 in the latter, screws as 11, fulcrum-pins as 12, bearings as 13, lugs as 14 and driving crank 15 are substantially the same and perform the same functions as the like designated parts comprising Figs. 1 to 6 inclusive. 8' denotes the pitman or driving crank, the latter comprising a bar instead of a tubular element as in Figs. 1 to 6 and as in the latter figures the axes of the crank-members cross the axes of their operating shafts for the purpose previously pointed out. The construction represented by the present modification comprises means for operatively connecting angularly arranged shafts, preferably shown at right angles, the feature in construction differing from the construction represented by Figs. 1 to 6 being the arranging of the fulcrum-pin 12, relatively to each other, to correspond with the angular relationship of the driving and driven shaft.

The modification represented by Figs. 9 to 16 inclusive, comprise means for transmitting motion to a driven shaft in a direction opposite to that of the driving shaft, and in said figures, 18 represents a bearing plate having brackets, as 19, provided with suitable bearings into which is journaled the driving shaft 20, the driven shaft 20' being journaled in suitable bearings formed in the brackets, as 21, carried by said plate, the driving shaft having a crank-member 22 carrying a crank connection 23 and the driven shaft a crank-member 22' carrying a crank connection 23', the latter shaft, crank-member and crank connection being similar to the driving shaft, its crank and crank connection. To effect the object of the present modified construction the two cranks are arranged in reverse relationship and offset in the direction of the length of the shafts a distance sufficient to cause the pitman or driving connection 24 to, at all times, occupy an oblique position relatively to the axes of said shafts, said pitman being pivoted at one end at one side of the vertex of the axes of the driven shaft and its crank-member, and at its opposite end at the opposite side of the vertex of the like axes of the driven shaft and its crank-member, thus causing the pitman to transmit to the driven crank-member 22' a torsional drive opposite to that transmitted to said pitman, and as the pitman at all times occupies a position oblique to the axes of the two shafts it will be understood that it is of greater length than the distance between said shafts. Each of the crank connections comprise separate members, as 25 and 26, secured together by suitable screws, as 27, the members 26 being provided with lugs, as 28, having openings, as 29, for the reception of the fulcrum-pins, as 30, into which is threaded the pivot screws, as 31, passing through suitable openings, as 32, formed in the arms, as 33, of the pitman 24. Taking Figs. 9 and 11 as representing the position of rest of the present or second modified construction, wherein the crank-members occupy their dead-center positions and the pitman its median position of oscillatory movement, the sequence of movements of the operative elements by quarter turns, in effecting one complete rotation are substantially the same as in the sequence of movements of the construction represented by Figs. 1 to 6, with the exception that the pitman effects a torsional drive of the driven shaft of the latter figures, as previously pointed out.

Figure 19:
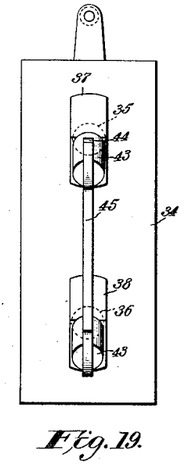
Figure 20:
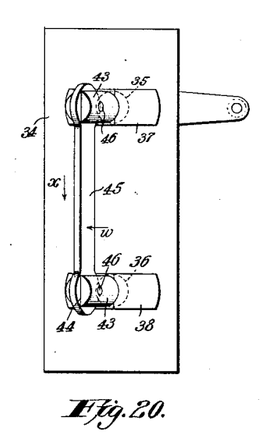
Figure 21:
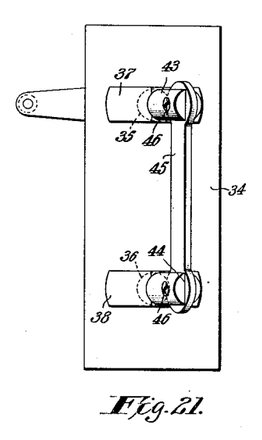
Figure 22:
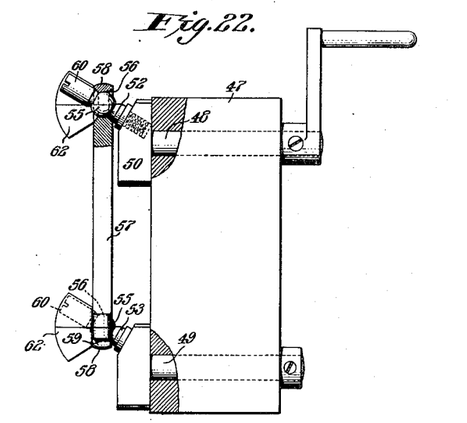
Fig. 22 is a side elevation.
Figure 23:
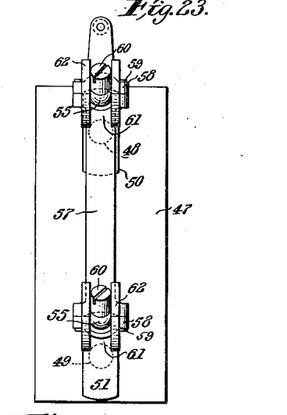
Figs. 23 and 24 end and side elevations respectively of Fig. 22 showing the crank-members in their oppositely arranged dead-center positions, and Figs. 25 and 26 side elevations similar to Fig. 22 showing the pitman in its oppositely arranged dead-center positions.
Figure 24:
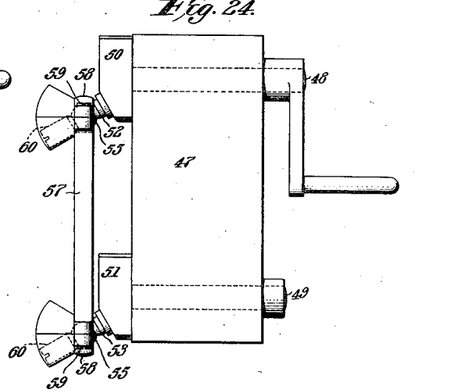
Figure 25:
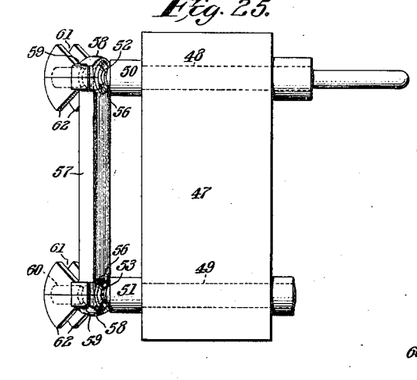
Figure 26:
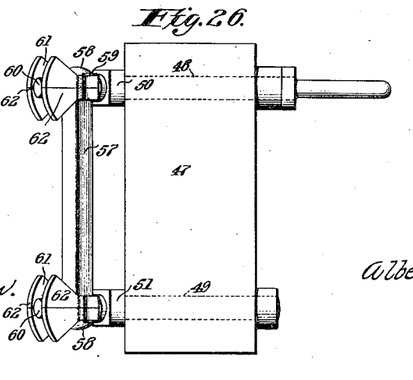

In the modification represented by Figs. 17 to 21, 34 represents a bearing plate provided with suitable bearings into which are journaled the driving shaft 35 and driven shaft 36 provided with crank heads 37 and 38 respectively, into which are journaled the crank-members 39 and 40 respectively, the latter held against lengthwise movements by screws, as 41, and shoulders, as 42, of the enlarged portions, as 43, of said crank-members, said enlarged portions being slotted, as at 44, to receive the pitman 45 suspended at its opposite ends by pivot screws, as 46. Taking Figs. 17 and 18 as representing the positions of rest of the present or third form of modified constructions, wherein the crank-members occupy their dead-center positions and the pitman its median position of oscillatory movement, the sequence of movements of the respective elements, by quarter turns, in effecting one complete rotation, are as follows: As the driving shaft 35 and elements driven by said shaft are given a quarter turn to the right or in the direction indicated by the arrow $u$ to the position represented by Fig. 20; the movements of the pitman in the direction indicated by the arrows $w$ and $x$ of the latter figure effect, through the rotary movements of the crank-members in their bearings 47 and the rocking movements of the opposite ends of the pitman on the pivot screw 46; a torsional drive of the crank-member 40 to rotate the driven shaft in a direction corresponding to that of the driving shaft, or past its dead-center position, when the crank-members and pitman coöperate to give to the driven shaft its first quarter turn to the position shown in Fig. 20, at which point the pitman occupies its dead-center position and the crank-members midway of their dead-center positions, when the crank-members carry the pitman past its dead-center position and coöperates with the latter member to effect the second dead-center positions of the crank-members, as represented by Fig. 19. The third quarter turn position represented by Fig. 21, is effected by movements of the pitman as in effecting the first quarter turn, except that the lateral and lengthwise movements of the pitman are in directions opposite to that indicated by the arrows $w$ and $x$, Fig. 20, and the return of the elements to their starting positions the same as in their travel from their positions represented by Fig. 20 to that of Fig. 19, except that the direction of movements of the pitman are reversed.

In the modification represented by Figs. 22 to 26, 47 represents a bearing plate provided with suitable bearings into which are journaled the driving shaft 48 and driven shaft 49 provided with crank heads 50 and 51 respectively, into which are threaded the crank-members 52 and 53 respectively, the latter being provided with ball-bearings, as 55, which coöperate with ball sockets, as 56, formed in the opposite ends of the pitman 57, said ball-sockets being formed partly in the main portion of the pitman and partly in the caps 58 secured to the end of said main portion by screws as 59. The crank-members are preferably formed with an extended portion, as 60, which track the slots, as 61, formed by the oppositely arranged flanges, as 62, a part of each of the latter being preferably formed integral with the main portion of the pitman and the similar parts integral with the caps 58, said extended portions 60 and flanges 62 coöperating to strengthen the means for effecting the torsional drive of said pitman 57. The sequence of movements of the present or fourth modification is the same as in the third modification represented by Figs. 17 to 21 both inclusive, except that the driving ball and socket bearing is employed to effect the oppositely arranged lateral and longitudinal movements of the pitman, instead of the loosely mounted crank-members 43 and pivotally suspended pitman 45 of the third modification.

Having thus set forth the nature of the invention, what I claim herein is:—

1. In a mechanical movement, in combination, two shafts each provided with a crank, a pitman, and connections between said cranks and said pitman, and including means sustained by said shafts, whereby the pitman is caused to perform oscillating movements and thereby to assume different positions in a circular path of movement in moving to opposite sides of the dead-center positions of said cranks.

2. In a mechanical movement, in combination, two shafts each provided with a crank, a pitman, and connections between said cranks and said pitman provided with means for progressively and positively turning the pitman into different positions in a circular path of movement and having fixed relation with corresponding consecutive positions of rotation of said cranks.

3. In a mechanical movement, in combination, two shafts each provided with a crank, a pitman, and connections between said cranks and said pitman acting positively to maintain the cranks in fixed predetermined relation while passing over their dead-center positions.

4. In a mechanical movement, in combination, two shafts each provided with a crank inclined to its axis, a pitman, and pivotal connections between said pitman and said cranks disposed each in angular relation with the axis of its respective crank and shaft.

5. In a mechanical movement, in combination, two shafts each provided with a crank inclined to its axis, a pitman, and pivotal connections between said pitman and said cranks and each offset from its respective crank and disposed in angular relation with the axis of said crank and its respective shaft.

6. In a mechanical movement, in combination, two rotary cranks, a pitman, and connections between said cranks and pitman acting respectively to convert the motion of one crank into torsional and endwise impulses on the pitman and to reconvert the same into rotary movement of the other cranks.

7. In a mechanical movement, in combination, two rotary cranks, a pitman, and universal joints comprising angularly disposed pivotal connections between said cranks and pitman acting respectively to convert the motion of one crank into torsional and endwise impulses on the pitman and to reconvert the same into rotary movement of the other crank.

8. In a mechanical movement, in combination, two shafts each provided with a crank inclined to its axis, sleeves embracing said cranks, a pitman, and pivotal connections between said pitman and said sleeves each disposed transversely to the crank embraced by its respective sleeve.

9. In a mechanical movement, in combination, two shafts each provided with a crank inclined to its axis, sleeves embracing said cranks, a pitman, and pivotal connections between said pitman and said sleeves each disposed at a right angle with the crank embraced by its respective sleeve.

10. In a mechanical movement, the combination with a driving and driven shaft each provided with a crank-member whose axis is arranged oblique to the axis of its shaft, of means for transmitting power from one to the other of said crank-members including a link connection suspended between the latter and having oppositely arranged transversely directed movements for transmitting motion from said driving to said driven shaft.

11. In a mechanical movement, the combination with a driving and driven shaft each provided with a crank-member having its axis arranged oblique to the axis of its shaft, of means for transmitting power from one to the other of said crank-members including a link connection suspended between the latter and having oppositely arranged transversely directed movements for transmitting from the driving shaft rotary movements to the driven shaft.

12. In a mechanical movement, the combination with a driving and driven shaft each provided with a crank-member whose axis is arranged oblique to the axis of its shaft, of means for transmitting power from one to the other of said crank-members including a link connection suspended between the latter and having oppositely arranged transversely directed movements for transmitting to said driven shaft movements isochronal with the movements of said driving shaft.

13. In a mechanical movement, the combination with a driving and a driven shaft each provided with a crank-member carrying a crank connection, of means for transmitting power from one to the other of said crank-members including a pitman pivotally suspended between said connections, one of the latter acting to transmit to said pitman oppositely arranged transversely directed movements.

14. In a mechanical movement, the combination with a driving and a driven shaft each provided with a crank-member carrying a crank connection, of means for transmitting power from one to the other of said crank-members including a pitman pivotally suspended between said connections, one of the latter acting to transmit to said pitman oppositely arranged transversely directed movements in different lateral positions.

15. In a mechanical movement, the combination with a driving and driven shaft arranged in angular relationship, each of said shafts being provided with a crank-member whose axis is arranged oblique to the axis of its shaft, of means for transmitting power from one to the other of said crank-members including a pitman whose opposite ends are operatively connected with their respective crank-members by pivotal connections arranged at an angle to each other.

16. In a mechanical movement, the combination with a driving and driven shaft arranged in angular relationship, each of said shafts being provided with a crank-member whose axis is arranged oblique to the axis of its shaft, of means for transmitting power from one to the other of said crank-members including a pitman whose opposite ends are operatively connected with their respective crank-members by pivotal connections arranged at an angle to each other corresponding substantially to the angular relationship of said shafts.

17. In a mechanical movement, the combination with a driving and driven shaft arranged in angular relationship, each of said shafts being provided with a crank-member whose axis is arranged oblique to the axis of its shaft, of means for transmitting power from one to the other of said crank-members including a link connection suspended between said crank-members comprising crank connections and a pitman, the opposite ends of the latter operatively connected with the respective crank connections by angularly arranged pivotal connections.

18. In a mechanical movement, the combination with a driving and driven shaft each provided with a crank-member whose axis is arranged oblique to the axis of its shaft; of means for transmitting power from one to the other of said crank-members including a pitman whose opposite ends are provided with pivotal connections the pivotal connection at one end of said pitman being arranged at the side of the vertex of the axes of the driven shaft and its crank-member opposite to that at which the other end of said pitman is pivoted relatively to the driving shaft.

19. In a mechanical movement, the combination with a driving and driven shaft each provided with a crank member offset relatively to each other in the direction of the length of said shafts and having their axes arranged oblique to the axis of the respective shafts, of means for transmitting power from one to the other of said crank-members including a pitman whose opposite ends are provided with pivotal connections, the pivotal connection at one end of said pitman being arranged at the side of the vertex of the axes of the driven shaft and its crank-member opposite to that at which the other end of said pitman is pivoted relatively to the driving shaft.

20. In a mechanical movement, the combination with a driving and driven shaft each provided with a crank-member whose axis is arranged oblique to the axis of its shaft, the axis of the driven crank-member being inclined opposite to that of the axis of the driving crank-member, of means for transmitting power from one to the other of said crank-members including a pitman whose opposite ends are provided with pivotal connections, the pivotal connections at one end of said pitman being arranged at the side of the vertex of the axes of the driven shaft and its crank-member opposite to that at which the other end of said pitman is pivoted relatively to the driving shaft.

21. In a mechanical movement, the combination with a driving and driven shaft each provided with a crank-member whose axis is arranged oblique to the axis of its shaft, of means for transmitting power from one to the other of said crank-members including a pitman of greater length than the distance between said shafts and whose opposite ends are provided with pivotal connections, the pivotal connection at one end of said pitman being arranged at the side of the vertex of the axes of the driven shaft and its crank-member opposite to that at which the other end of said pitman is pivoted relatively to the driving shaft.

22. In a mechanical movement, the combination with a driving and driven shaft each provided with a crank-member whose axis is arranged oblique to the axis of its shaft and having movements with and independent of the respective shafts, of means for transmitting power from one to the other of said crank-members comprising a pitman suspended between the latter.

23. In a mechanical movement, the combination with a driving and driven shaft each provided with a bearing into which is journaled a crank member whose axis is arranged oblique to the axis of its shaft, of means for transmitting power from one to the other of said crank-members comprising a pitman suspended between the latter.

24. In a mechanical movement, the combination with a driving and driven shaft each provided with a bearing into which is journaled a crank-member whose axis is arranged oblique to the axis of its shaft, of means for transmitting power from one to the other of said crank-members comprising a pitman pivotally suspended between the latter.

25. In a mechanical movement, the combination with a driving and driven shaft each provided with a crank-member whose axis is arranged oblique to the axis of its shaft, of means for transmitting power from one to the other of said shafts including a pitman suspended between said crank-members by ball and socket connections.

26. In a mechanical movement, the combination with a driving and driven shaft each provided with a crank-member whose axis is arranged oblique to the axis of its shaft and having extended portions, of means for transmitting power from one to the other of said shafts including a pitman suspended between said crank-members by ball and socket connections and provided with flanges between which said extended portions track.

27. In a mechanical movement, the combination with a driving and driven shaft each provided with a crank-member whose axis is arranged oblique to the axis of its shaft and having free end extended portions, of means for transmitting power from one to the other of said shafts including a pitman suspended between said crank-members by ball and socket connections and provided with flanges between which said free end extended portions track.

In testimony whereof, I have signed my name to this specification, in the presence of two subscribing witnesses.

ALBERT H. DE VOE.

Witnesses:
L. E. FISCHER,
H. A. KORNEMANN, Jr.